June 9, 1925.  
J. KOENIG ET AL  
ELECTRICALLY HEATED PERCOLATOR  
Filed Dec. 3, 1923
1,541,418
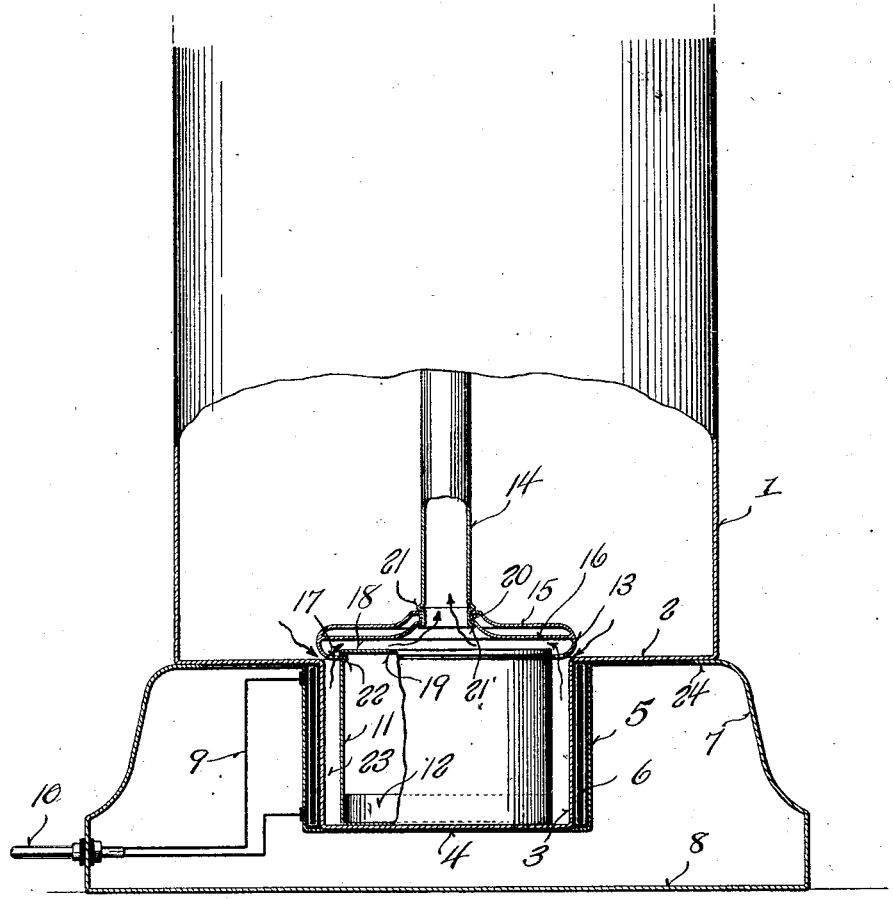
Inventors  
Joseph Koenig  
Remus Koenig Patented June 9, 1925.

1,541,418

UNITED STATES PATENT OFFICE.

JOSEPH KOENIG AND REMUS KOENIG, OF MANITOWOC, WISCONSIN.

ELECTRICALLY-HEATED PERCOLATOR.

Application filed December 3, 1923. Serial No. 678,178.

*To all whom it may concern:*

Be it known that we, JOSEPH KOENIG and REMUS KOENIG, both citizens of the United States, and residents of Manitowoc, in the county of Manitowoc and State of Wisconsin, have invented certain new and useful Improvements in Electrically-Heated Percolators; and we do hereby declare that the following is a full, clear, and exact description thereof.

This invention relates to electrically heated percolators.

Objects of this invention are to provide an electrically heated percolator in which the water receiving portion is formed of an integral piece of material throughout its lower portion to avoid any possibility of leaking of the water into the heating element, and in which the construction is such that the electrical heating element may be most readily positioned during assembly and easily associated with the remaining portion of the percolator.

Further objects are to provide an electrically heated percolator in which only a small portion of water is at one time exposed to the highly heated surface, in which an extensive heated surface is provided, in which provision is made against the needless and undesirable condensation of steam against the lower portion of the percolator, and in which the parts are so associated as to permit ready separation and easy cleaning.

An embodiment of the invention is shown in the accompanying drawing, in which:—

The single figure is a fragmentary sectional view through the lower portion of a percolator showing the active portions thereof.

The percolator comprises a main pot 1 which is equipped with a bottom 2 provided with a downwardly extending cylindrical portion 3 closed by a circular bottom 4. The portions 1, 2, 3 and 4 are formed of a single integral piece of material and are devoid of seams or joints.

This construction may be secured in any suitable manner as by pressing, spinning, casting or similar operations.

The cylindrical wall 3 is surrounded by spaced cylindrical walls 5 and between these walls the heating element 6 of any suitable construction is located. A hollow base portion 7 is provided and secured to the bottom 2 of the pot and is itself equipped with a continuous bottom 8 so as to protect the interior portions. Leads 9 extend from the heating element 6 to suitable terminals such as the plugs 10 insulated and projecting from the bottom portion 7 and adapted to receive the standard socket. Within the cylindrical portion 3 a smaller air tight cylindrically formed chamber is located. This chamber is provided with vertical cylindrical walls 11 which parallel the walls 3. If desired, a weight 12 may be positioned within the lower portion of this air tight chamber to counteract its buoyancy.

Adjacent the upper end of the chamber a curved outwardly projecting flange 13 is formed which projects inwardly into contact with the tube 14 of the percolator. This member 13 is preferably provided with a pair of spaced upper walls 15 and 16 and is further provided with apertures 17 which communicate with the constricted space 18 between the lowermost wall 16 and the top 19 of the air tight chamber. A convenient way of forming the joint between the tube 14 and the walls 15 and 16 is to form such walls of an integral construction, that is to say, adjacent their central portion to join them by a short vertically extending web 20. The tube 14 is provided with an offset shoulder 21 which rests upon the upper side of the uppermost wall 15 and is provided with an outturned shoulder which clamps against the under side of the under wall 16 thus forming a rigid and secure joint. If desired, the wall 11 may be provided with a grooved portion 22 which receives the inturned inner edge of the flange 13.

The upper portion of the percolator may be of the standard construction.

The operation of the apparatus is as follows:—Water passes downwardly, as shown by the arrow, between the flange portion 13 and the inner edge of the bottom 2 through the restricted annular space, as illustrated in the drawings and into the annular chamber 23 between the walls 3 and 11. The water in this space is in direct contact with an extensive heated surface, namely, the vertical cylindrical wall 3 and is quickly brought to a high temperature with consequent evolution of steam. The formation of steam in this chamber 23 occurs with relative suddenness and forces the water upwardly through the opening 17 into the space 18 and from thence up the tube 14. It is to be noted that the double wall construction, as illustrated at 15 and 16, prevents the condensation of this steam and insures a quick upward travel of the liquid in the tube 14 as such liquid is started upwardly in the tube by all of the generated steam without loss due to condensation. Further, it will be noted that the air tight chamber fills the cylindrical depressed portion formed of the wall 3 and the bottom 4 except for the relatively small annular compartment 23 previously described. Thus the heated element is not called upon to heat the full volumetric contents of this depressed portion but only a relatively small annular section of water, and it is further to be noted that this relatively small portion of water directly contacts with an extensive heated area, thus insuring rapid and effective operation.

It is further to be noted that the bottom portion 7 does not extend completely across to the wall 5 but terminates a slight distance inwardly of the bottom 2 to provide an annular supporting flange 24. Thus an extended portion of the bottom 2 is in direct contact with the air within the main bottom of the device and, as such air becomes heated due to any radiant heat from the element 6, this heat will be transmitted to the bottom 2 and will maintain the coffee within the main body 1 of the pot at a suitably elevated temperature. However, boiling will not occur as the area of the bottom 2 is very large and is in contact with the contents of the coffee pot.

It will thus be seen that means have been provided for quickly and effectively heating a restricted portion of the contents of the pot while maintaining a uniform temperature for other portions thereof.

It will be apparent that the air tight chamber and tube 14 which are joined as a unitary member may be most readily lifted from the pot to facilitate cleaning, and that the cylindrical depression formed of the vertical wall 3 and the bottom 4 presents no obstructions to interfere with free and easy cleaning.

Although the invention has been described in considerable detail, it is to be understood that the invention may be variously embodied and is, therefore, to be limited only as claimed.

We claim:

1. An electrically heated percolator comprising a main body portion provided with a bottom having a depressed portion provided with a vertical wall, an electric heating element surrounding said vertical wall, a closed compartment fitted within said depression and spaced from the vertical wall, and a tube extending upwardly and communicating with the space between said compartment and said vertical wall, whereby when steam is formed in the spacing between said compartment and wall, heated water will be projected upwardly through said tube.

2. An electrically heated percolator comprising a main body portion provided with a bottom having a depressed portion provided with a vertical wall, an electric heating element surrounding said vertical wall, a closed compartment fitted within said depression and spaced from the vertical wall, a tube extending upwardly and communicating with the space between said compartment and said vertical wall, whereby when steam is formed in the spacing between said compartment and wall, heated water will be projected upwardly through said tube, and a weight located in the bottom portion of said compartment.

3. An electrically heated percolator comprising a body portion having a bottom provided with a central depression having a cylindrical vertical wall and a closed bottom, an electric heating element surrounding said cylindrical wall, and a removable member consisting of a vertical tube, an air tight compartment located below said tube and adapted to approximately fill said depressed portion, and a hollow member communicating with said compartment and provided with apertures adjacent thereto and joined to said tube whereby the space between said compartment and said cylindrical wall is in direct communication with said tube.

4. An electrically heated percolator comprising a body portion having a bottom provided with a central depression having a cylindrical vertical wall and a closed bottom, an electric heating element surrounding said cylindrical wall, and a removable member consisting of a vertical tube, an air tight compartment having its top below said tube and adapted to approximately fill said depressed portion, and a plate attached to said air tight compartment and to said tube and spaced from the top of said compartment, said plate having apertures therethrough which place the space between said wall and said top in communication with the space between said compartment and the vertical wall of said depressed portion.

5. An electrically heated percolator comprising a main body portion having an annular bottom, cylindrical walls extending from said annular bottom and having a circular bottom, said circular bottom, cylindrical walls, annular bottom and main body portion being formed of a single integral piece of material, an electric heating element surrounding said cylindrical wall, and a removable unit consisting of a closed compartment having cylindrical walls spaced from said first mentioned cylindrical walls, a vertical tube positioned above the top of said compartment and a doubled walled member mechanically joining said tube and said compartment and having the lowermost of its walls spaced from the top of said compartment, said member having apertures communicating with the space between said first and second mentioned cylindrical walls.

In testimony that we claim the foregoing we have hereunto set our hands at Manitowoc, in the county of Manitowoc and State of Wisconsin.

JOSEPH KOENIG.
REMUS KOENIG.